W. A. CARLETON AND C. E. YOHO.
WRENCH.
APPLICATION FILED APR. 26, 1921.
1,398,125.
Patented Nov. 22, 1921.
2 SHEETS—SHEET 2.
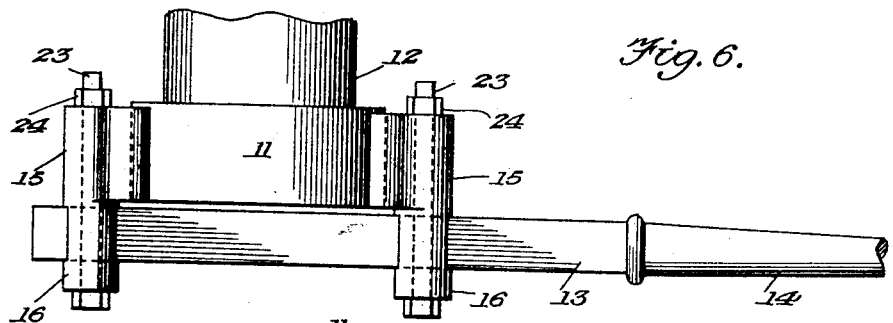
Fig. 6.
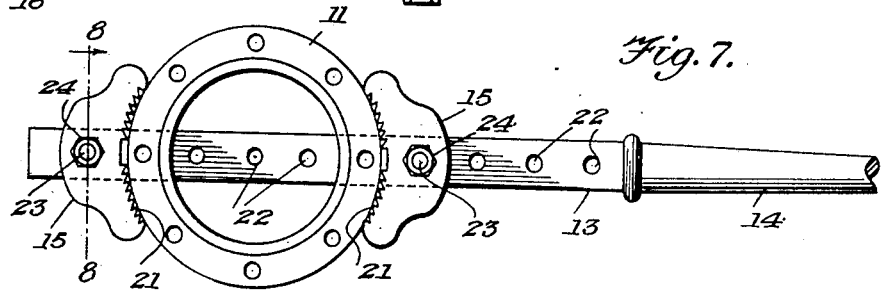
Fig. 7.
Fig. 8.
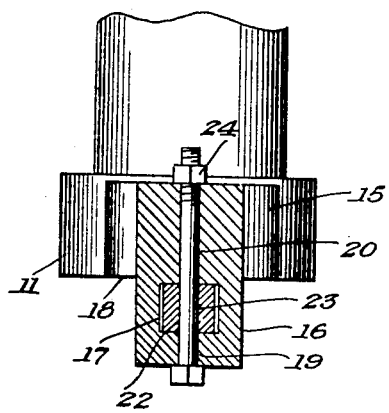
Fig. 9.
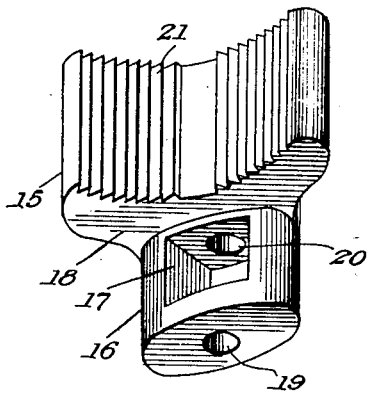
William A. Carleton
Clarence E. Yoho
INVENTOR
BY Victor J. Evans
ATTORNEY
WITNESS:

UNITED STATES PATENT OFFICE.

WILLIAM AUTHUR CARLETON AND CLARENCE ERASTUS YOHO, OF BELLAIRE, OHIO.

WRENCH.

1,398,125.  Specification of Letters Patent.  Patented Nov. 22, 1921.

Application filed April 26, 1921. Serial No. 464,767.

*To all whom it may concern:*

Be it known that we, WILLIAM AUTHUR CARLETON and CLARENCE ERASTUS YOHO, citizens of the United States, residing at Bellaire, in the county of Belmont and State of Ohio, have invented new and useful Improvements in Wrenches, of which the following is a specification.

Our present invention has reference to improvements in wrenches.

Our object is to produce an extremely simple construction of wrenches for engaging flanges on pipes, screw couplings, etc., in which the flange engaging means are adjustable with respect to each other whereby the same may be brought for proper engagement with different sizes of flanges.

It is a further object to produce a flange wrench that is provided with removable, adjustable, and interchangeable flange engaging means, whereby the flange may be engaged either at the periphery or through the openings therein.

The foregoing, and other objects which will appear as the nature of the invention is better understood, may be accomplished by a construction, combination and operative association of parts, such as is disclosed by the drawings which accompany and which form part of this application.

In the drawings:—

Fig. 6 is an edge view showing the improvement provided with pivoted jaws and engaging the periphery of a flange for a coupling or pipe.

Fig. 7 is a top plan view thereof.

Fig. 8 is a sectional view on the line 8—8 of Fig. 7.

Fig. 9 is a perspective view of one of the jaws.

Figure 1:
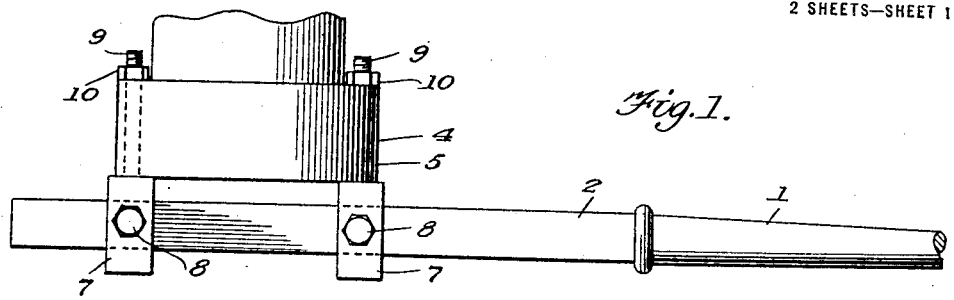
Figure 1 is an edge view of the wrench showing the same engaging certain of the bolt openings in the flange of a pipe or coupling.
Figure 2:
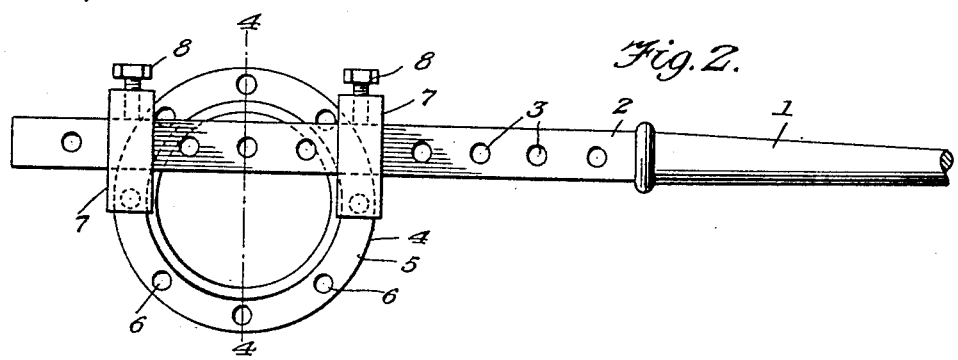
Fig. 2 is a bottom plan view thereof.
Figure 3:
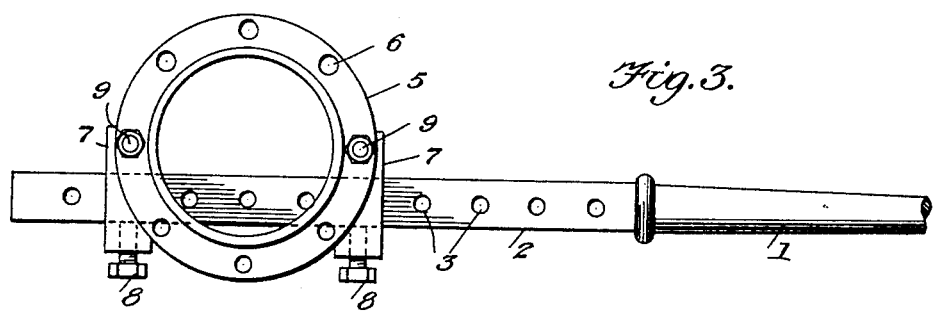
Fig. 3 is a top plan view thereof.
Figure 4:
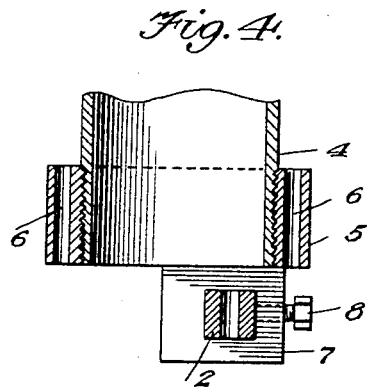
Fig. 4 is a sectional view on the line 4—4 of Fig. 2.
Figure 5:
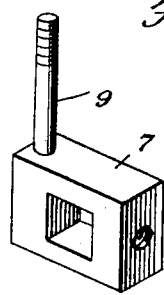
Fig. 5 is a sectional view on the line 5—5 of Fig. 1.

As disclosed by the drawings, we make use of a handle 1 that has a flat substantially rectangular extension in the nature of a shank 2. The shank is provided with a series of spaced longitudinally arranged apertures 3.

When it is desired to employ our improvement for turning a pipe or coupler member 4 that has its flange 5 provided with bolt openings 6, we arrange upon the shank 2 slidable members 7. The members 7 are in the nature of jaws, the openings therein being of a size to snugly receive the shank 2. The jaws are substantially rectangular in formation and have at one of their ends threaded openings. In each of the openings there is screwed the shank of a bolt member 8. The head of the member may be engaged by a wrench, and the shank thereof is designed to have its end contacting with one of the edges of the shank 2. By this means, the jaw members 7 may be adjusted on the shank toward or away from each other. Each jaw member carries an outstanding pin 9, and the said pins are designed to be passed through two of the diametrically opposed openings 6 in the flange 5. Preferably the pins 9 have their outer ends threaded and are engaged by nuts 10. In this manner, the wrench may be suspended from the coupling. It will be obvious that a firm grip is obtained on the flange 5, that the jaws may be adjusted to engage with varying sizes of flanges, and that the flange may be easily turned by the operation of the wrench.

When it is desirable for employing the wrench to engage with the periphery of a flange 11 of a pipe or coupling, 12, we arrange on the shank 13 of the wrench 14 pivoted jaws which are each broadly indicated by the numeral 15. Each jaw 15 includes a reduced extension in the nature of a shank 16. Each shank has an elongated transverse opening 17 therethrough, the said opening being arranged in a line with the lower wall 18 of the jaw proper. The outer end of the shank 16 has a bolt opening 19 therethrough which alines with a similar bolt opening 20 in the head portion of the jaw 15. The width of the opening 16 is materially greater than that of the shank 13, and the jaw 15 is projected beyond what may be termed the inner face of the shank, the engaging face of the jaw being arcuate and toothed, as at 21. Designed to pass through the registering openings 19 and 20 in the jaw and through the openings 22 in the shank 13 are bolts 23. These bolts have their outer ends engaged by nuts 24. It is, of course, obvious that the outer jaw 15 may be permanently positioned on the shank 13, which necessitates only the removal of the nut and bolt that engages the inner jaw to permit of the movement of the said inner jaw longitudinally on the shank 13. When properly positioned to engage with the desired size of flange 11, the bolt is again passed through the openings in the jaw and through one of the openings 22 in the shank 13. It will be also obvious that the jaws are permitted a swinging movement, but such movement is limited by the contacting engagement of the end walls provided by the opening 17 in the shank 16 with the edges of the shank 13 of the wrench. This swinging movement of the jaws permits of a gripping engagement of the said jaws with the periphery of the shank and a ratcheting movement of one of the jaws over the flange when a fresh grip is to be obtained thereon.

It is believed that the foregoing description, when taken in connection with the drawings will fully set forth the construction, advantages and method of operating the improvement, so that further detailed description is not believed necessary. It is, however, thought necessary to state that the improvement is not to be restricted to the showing or to the description, and is limited only to the scope of the appended claim.

Having described the invention, we claim:—

In a wrench for engaging the flanges of a coupling, pipe or the like, a handle having a rectangular extension providing a shank and said shank having spaced openings therethrough, jaws having arcuate toothed engaging faces arranged on the shank, said jaws having reduced extensions which are slotted and which receive the shank through the slots, said slots being of a width greater than that of the shank, pivot members passing through the jaws and certain of the openings in the shank, and means securing said pivot members on the jaws.

In testimony whereof we affix our signatures.

WILLIAM AUTHUR CARLETON.
CLARENCE ERASTUS YOHO.